(12) United States Patent
Hu et al.

(10) Patent No.: US 11,463,779 B2
(45) Date of Patent: Oct. 4, 2022

(54) VIDEO STREAM PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Xiaohua Hu, Shenzhen (CN); Ziheng Luo, Shenzhen (CN); Xiuming Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/922,904

(22) Filed: Jul. 7, 2020

(65) Prior Publication Data

US 2020/0336796 A1   Oct. 22, 2020

Related U.S. Application Data

(63) Continuation of application No. PCT/CN2019/079830, filed on Mar. 27, 2019.

(30) Foreign Application Priority Data

Apr. 25, 2018   (CN) .................. 201810380157.X

(51) Int. Cl.
*H04N 21/488*   (2011.01)
*G10L 15/26*   (2006.01)
(Continued)

(52) U.S. Cl.
CPC ......... *H04N 21/4884* (2013.01); *G06V 20/46* (2022.01); *G10L 15/26* (2013.01); *H04N 21/233* (2013.01)

(58) Field of Classification Search
CPC .. H04N 21/23; H04N 21/233; H04N 21/2335; H04N 21/42203; H04N 21/4307;
(Continued)

(56) References Cited

U.S. PATENT DOCUMENTS 9,355,094 B2 *   5/2016   Cuthbert ............... G06F 3/0346
9,953,631 B1 *   4/2018   Cuthbert ............... G10L 15/005
(Continued)

FOREIGN PATENT DOCUMENTS

CN   103458321 A   12/2013
CN   103561217 A    2/2014
(Continued)

OTHER PUBLICATIONS

Chinese Office Action Issued in Application CN201810380157.X dated Mar. 17, 2021 with concise English Translation, (9 pages).
(Continued)

*Primary Examiner* — Nnenna N Ekpo
(74) *Attorney, Agent, or Firm* — Arentfox Schiff LLP

(57) ABSTRACT

A video stream processing method is provided. First audio stream data in live video stream data is obtained. Speech recognition is performed on the first audio stream data to generate speech recognition text. Caption data is generated according to the speech recognition text, the caption data including caption text and time information corresponding to the caption text. The caption text is added to a corresponding picture frame in the live video stream data according to the time information corresponding to the caption text to generate captioned live video stream data.

20 Claims, 13 Drawing Sheets

(51) Int. Cl.
*H04N 21/233* (2011.01)
*G06V 20/40* (2022.01)

(58) Field of Classification Search
CPC ............... H04N 21/435; H04N 21/439; H04N 21/4394; H04N 21/4856; H04N 21/4884; G06K 9/00744; G10L 15/00; G10L 15/005; G10L 15/16; G10L 15/18; G10L 15/22

See application file for complete search history.

(56) References Cited

U.S. PATENT DOCUMENTS

| | | | |
|---|---|---|---|
| 2001/0025241 A1 | 9/2001 | Lange et al. | |
| 2002/0116185 A1* | 8/2002 | Cooper | G10L 15/26 704/231 |
| 2004/0068410 A1* | 4/2004 | Mohamed | G10L 21/06 704/276 |
| 2005/0080631 A1* | 4/2005 | Abe | G10L 15/26 704/276 |
| 2006/0285654 A1 | 12/2006 | Nesvadba et al. | |
| 2011/0019087 A1* | 1/2011 | Chao | G11B 27/11 348/468 |
| 2013/0295534 A1* | 11/2013 | Meiri | G09B 19/06 434/157 |
| 2015/0016801 A1* | 1/2015 | Homma | G09B 19/06 386/243 |
| 2016/0066055 A1* | 3/2016 | Nir | H04N 21/439 725/35 |
| 2017/0353770 A1 | 12/2017 | Jiang et al. | |
| 2018/0041783 A1 | 2/2018 | Xu | |
| 2018/0277142 A1* | 9/2018 | Veeramani | G06F 40/58 |
| 2019/0387263 A1* | 12/2019 | Xu | H04N 21/83 |
| 2020/0404386 A1* | 12/2020 | McCartney, Jr. | H04N 21/235 |

FOREIGN PATENT DOCUMENTS

| | | |
|---|---|---|
| CN | 103945141 A | 7/2014 |
| CN | 104581221 A | 4/2015 |
| CN | 105744346 A | 7/2016 |
| CN | 105828101 A | 8/2016 |
| CN | 106303303 A | 1/2017 |
| CN | 107222792 A | 9/2017 |
| CN | 107690089 A | 2/2018 |
| CN | 108063970 A | 5/2018 |
| CN | 108401192 A | 8/2018 |
| CN | 108600773 A | 9/2018 |
| EP | 2827586 A1 | 1/2015 |
| EP | 2600628 B1 | 1/2017 |
| WO | WO2017/107578 A1 | 6/2017 |

OTHER PUBLICATIONS

Extended European Search Report Issued in Application No. 19792095.2-1209/ Patent No. PCT/CN2019/079830 dated Jan. 18, 2021, (10 pages).

Jordi Robert-Ribes, "On the use of automatic speech recognition for TV captioning", Oct. 1, 1998 (4 pages).

International Search Report Issued in Application PCT/CN2019/079830 dated Jun. 17, 2019, with English Abstract (6 pages).

Written Opinion Issued in Application PCT/CN2019/079830 dated Jun. 17, 2019 (4 pages).

* cited by examiner

VIDEO STREAM PROCESSING METHOD AND APPARATUS, COMPUTER DEVICE, AND STORAGE MEDIUM

RELATED APPLICATION

This application is a continuation of International Application No. PCT/CN2019/079830, filed on Mar. 27, 2019, which claims priority to Chinese Patent Application No. 201810380157.X, entitled "VIDEO STREAM PROCESSING METHOD AND APPARATUS, COMPUTER DEVICE, AND STORAGE MEDIUM" and filed on Apr. 25, 2018. The entire disclosures of the prior applications are hereby incorporated by reference in their entirety.

FIELD OF THE TECHNOLOGY

This application relates to the field of Internet application technologies, including a video stream processing method and apparatus, a computer device, and a storage medium.

BACKGROUND OF THE DISCLOSURE

With continuous development of the mobile Internet, live video streaming is more widely applied. As a new way of content propagation, the live video streaming is becoming more popular. The live video streaming is not only in real-time, but also has a wider coverage area (e.g., it may be applied to web TVs, PCs, and mobile terminals) and lower cost, which is easier to operate.

During the live video streaming on the Internet, in addition to images and sounds, information that needs to be conveyed to a terminal user sometimes further includes captions to improve a viewing experience of the user.

SUMMARY

An embodiment of this application provides a video stream processing method. First audio stream data in live video stream data is obtained. Speech recognition is performed on the first audio stream data to generate speech recognition text. Caption data is generated according to the speech recognition text, the caption data including caption text and time information corresponding to the caption text. The caption text is added to a corresponding picture frame in the live video stream data according to the time information corresponding to the caption text to generate captioned live video stream data.

An embodiment of this application further provides a video stream processing apparatus, including processing circuitry. The processing circuitry is configured to obtain first audio stream data in live video stream data and perform speech recognition on the first audio stream data to generate speech recognition text. The processing circuitry is configured to generate caption data according to the speech recognition text. The caption data includes caption text and time information corresponding to the caption text. The processing circuitry is further configured to add the caption text to a corresponding picture frame in the live video stream data according to the time information corresponding to the caption text to generate captioned live video stream data.

An embodiment of this application further provides a computer device, including a processor and a memory, the memory storing instruction which when loaded and executed by the processor cause the processor to implement the foregoing video stream processing method.

An embodiment of this application further provides a non-transitory computer-readable storage medium storing instructions, which when executed by a processor, cause the processor to perform a video stream processing method. First audio stream data in live video stream data is obtained. Speech recognition is performed on the first audio stream data to generate speech recognition text. Caption data is generated according to the speech recognition text. The caption data includes caption text and time information corresponding to the caption text. The caption text is added to a corresponding picture frame in the live video stream data according to the time information corresponding to the caption text to generate captioned live video stream data.

It is to be understood that the above general descriptions and the following detailed descriptions are merely for exemplary and explanatory purposes, and cannot limit this application.

BRIEF DESCRIPTION OF THE DRAWINGS

The accompanying drawings, which are incorporated herein and constitute a part of this specification, illustrate exemplary embodiments consistent with this application and, together with the specification, serve to explain principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The following implementations described in the following exemplary embodiments do not represent all implementations of this application. The implementations are merely examples of apparatuses and methods that are described in detail and that are consistent with some aspects of this application.

Before the embodiments of this application are described, several concepts involved in this application are described first:

(1) Caption refers to, for example, non-image content such as a dialog or a narration displayed in an online video, a TV drama, a movie, and stage productions in a form of text, and also refers to, for example, texts added during post-processing of films and television works in general.

(2) Live streaming is, for example, a set of technologies that displays vivid and intuitive pictures of the real world to users with images, sounds, texts and other diversified elements through the Internet by using a streaming technology, which involves a series of service modules such as an encoding tool, streaming data, a server, a network, and a player.

(3) Real-time translation refers to, for example, instantly translating (or translating in real-time) speech or text from one language to another language manually or using a computer. In some embodiments of this application, the real-time translation may be speech recognition and instant translation based on artificial intelligence (AI).

Figure 1:
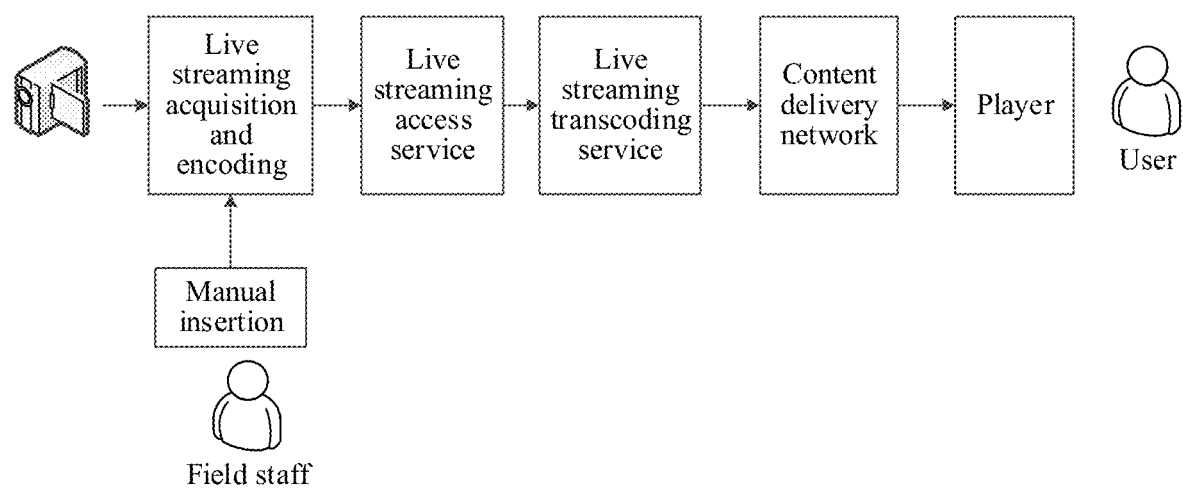
FIG. 1 is a schematic diagram of a live streaming procedure according to an embodiment of this application.

In some embodiments, a caption in a live video is usually inserted manually at a live video recording terminal (e.g., a recording field or a studio). For example, FIG. 1 is a schematic diagram of a live streaming procedure according to some embodiments of this application. As shown in FIG. 1, in a process in which the live video recording terminal acquires and encodes video images, the live video recording terminal uploads a live video stream to a server through a live streaming access service and field staff manually insert caption data. The server transcodes the live video stream through a live streaming transcoding service and transmits the transcoded live video stream through a content delivery network to a player at a user terminal side for playback. For relationships between the live video recording terminal, the server, and the user terminal, reference may be made to FIG. 2.

However, in the foregoing solution of inserting a caption into a live video, the caption data needs to be inserted manually at the live video recording terminal. The accuracy of synchronization of the caption data with live video pictures is relatively low, and usually a relatively high live streaming delay is caused, thereby affecting the live streaming effect.

Figure 2:
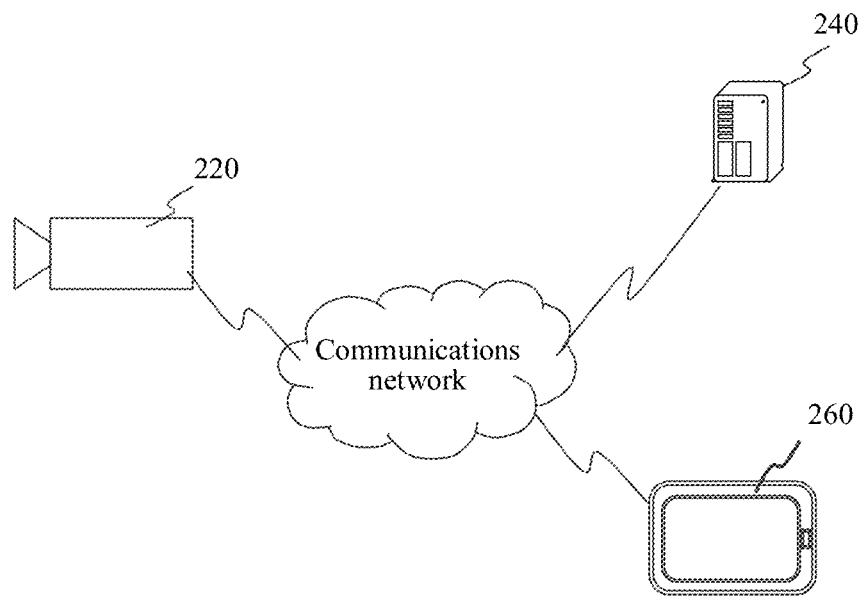
FIG. 2 is a schematic structural diagram of a live streaming system according to an exemplary embodiment.

FIG. 2 is a schematic structural diagram of a live streaming system according to an exemplary embodiment. The system includes: a live video recording terminal 220, a server 240, and a plurality of user terminals including a user terminal 260.

The live video recording terminal 220 may be a mobile phone, a tablet computer, an e-book reader, smart glasses, a smartwatch, a moving picture experts group audio layer III (MP3) player, a moving picture experts group audio layer IV (MP4) player, a laptop portable computer, a desktop computer, or the like.

The live video recording terminal 220 includes an image acquisition component and an audio acquisition component. The image acquisition component and the audio acquisition component may be parts of the live video recording terminal 220. For example, the image acquisition component and the audio acquisition component may be a built-in camera and a built-in microphone of the live video recording terminal 220. Alternatively, the image acquisition component and the audio acquisition component may be peripheral devices connected to the live video recording terminal 220. For example, the image acquisition component and the audio acquisition component may be an external camera and an external microphone connected to the live video recording terminal 220. Alternatively, one of the image acquisition component and the audio acquisition component may be built in the live video recording terminal 220, and the other being a peripheral device of the live video recording terminal 220. For example, the image acquisition component may be a built-in camera of the live video recording terminal 220, and the audio acquisition component may be an external microphone in an earphone connected to the live video recording terminal 220. Implementation forms of the image acquisition component and the audio acquisition component are not limited in this embodiment of this application.

The user terminal 260 may be a terminal device having a video playback function. For example, the user terminal may be a mobile phone, a tablet computer, an e-book reader, smart glasses, a smartwatch, an MP3/MP4 player, a laptop portable computer, a desktop computer, or the like.

The live video recording terminal 220 and the user terminal 260 are connected to the server 240 through a communications network. In some embodiments, the communications network is a wired network or a wireless network.

In an embodiment of this application, the live video recording terminal 220 may upload a live video stream recorded locally to the server 240, and the server 240 processes the live video stream and then pushes the processed live video stream to the user terminal 260.

The server 240 can be one or more servers, a virtualization platform, or a cloud computing service center.

The live video recording terminal 220 may be installed with a live streaming application (APP) client, for example, a Tencent Video client or a Huayang Live client. The server 240 may be a live streaming server corresponding to the live streaming APP.

During live streaming, the live video recording terminal runs the live streaming APP client, a user (who may also be referred to as an anchor) triggers and starts a live streaming function in a live streaming APP interface, and then the live streaming APP client invokes the image acquisition component and the audio acquisition component in the live video recording terminal to record a live video stream, and uploads the recorded live video stream to the live streaming server. The live streaming server receives the live video stream, and establishes a live streaming channel for the live video stream. A user of the user terminal may access the live streaming server through a live streaming APP client or a browser client installed in the user terminal, and selects the live streaming channel at the access interface. Then the live streaming server pushes the live video stream to the user terminal. The user terminal plays the live video stream in a live streaming APP interface or a browser interface.

In some embodiments, the system may further include a management device (not shown in FIG. 2). The management device can be connected to the server 240 through a communications network. In some embodiments, the communications network is a wired network or a wireless network.

In some embodiments, a standard communications technology and/or protocol is used for the wireless network or the wired network. The network is usually the Internet, but may alternatively be any other network, including but not limited to, a local area network (LAN), a metropolitan area network (MAN), a wide area network (WAN), or any combination of a mobile, wired, or wireless network, a dedicated network, or a virtual dedicated network. In some embodiments, technologies and/or formats such as the hypertext markup language (HTML) and the extensible markup language (XML) are used to represent data exchanged through the network. In addition, all or some links may be encrypted by using secure socket layer (SSL), transport layer security (TLS), virtual private network (VPN), internet protocol security (IPsec), and other common encryption technologies. In some other embodiments, custom and/or dedicated data communication technologies may also be used in place of or in addition to the foregoing data communication technologies.

Figure 3:
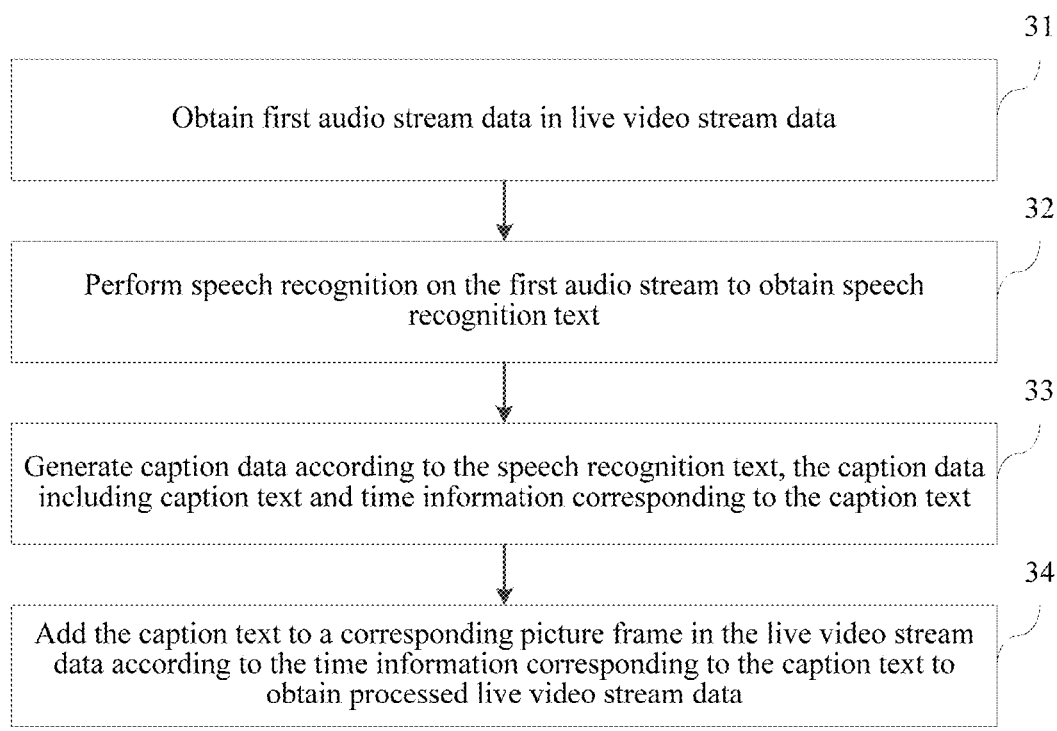
FIG. 3 is a flowchart of a video stream processing method according to an exemplary embodiment.

FIG. 3 is a flowchart of a video stream processing method in a live streaming scenario according to an exemplary embodiment. The video stream processing method in the live streaming scenario may be applied to the live streaming system shown in FIG. 2. As shown in FIG. 3, the video stream processing method in the live streaming scenario may include the following steps.

In step 31, first audio stream data in live video stream data is obtained. The audio stream data may be stream data including audio frames in the live video stream.

In step 32, speech recognition is performed on the first audio stream data to obtain (or generate) speech recognition text. For example, the speech recognition refers to recognizing speech in the first audio stream data into text of a corresponding language type.

In step 33, caption data is generated according to the speech recognition text. The caption data includes caption text and time information corresponding to the caption text. For example, the time information may be information used for indicating a play time of the caption data, the audio stream data, or the live video stream data.

In step 34, the caption text is added to a corresponding picture frame in the live video stream data according to the time information corresponding to the caption text to obtain (or generate) processed live video stream data (e.g., captioned live video stream data).

As shown in step 31 to step 33, the steps of obtaining the audio stream data, performing speech recognition, and generating the caption data according to the speech recognition result inevitably need to consume processing time. Therefore, in this embodiment of this application, the step of adding the caption text to a corresponding picture frame in the live video stream data according to the time information corresponding to the caption text to obtain processed live video stream data (i.e., step 34) may be performed after a delay of a preset duration from a first moment, the first moment being a moment (or time) at which the live video stream data is obtained.

In an embodiment of this application, a fixed delay duration (i.e., the preset duration) may be preset (e.g., to 5 minutes), and timing is started when the live video stream data is obtained. On the one hand, the live video stream data is cached; on the other hand, step 31 to step 33 are performed, and the caption data generated in step 33 is cached. When the timing reaches the delay duration, the cached live video stream data and caption data are extracted, and step 34 is performed according to the extracted live video stream data and caption data.

The preset duration may be preset in code by a developer, or the preset duration may be set or modified by a system manager or a user. The preset duration may be longer than a duration required to perform step 31 to step 33.

In a possible implementation, step 34 may be performed directly at a moment at which the caption data is obtained.

In an embodiment of this application, for a piece of live video stream data, after the live video stream data is obtained, on the one hand, the live video stream data is cached; on the other hand, step 31 to step 33 are performed. Provided that caption data is stored successfully, live video stream data corresponding to the caption data may be extracted from the cache, and step 34 may be performed according to the generated caption data and the live video stream data extracted from the cache.

For example, a server may provide a caption generation service, a caption storage service, and a caption integration service. The caption generation service is used for generating caption data according to speech recognition text, the caption storage service is used for receiving and storing the caption data generated by the caption generation service, and the caption integration service is used for adding caption text in the caption data stored by the caption storage service to a picture frame in live video stream data. In an embodiment of this application, when the caption integration service receives a caption data storage success notification transmitted by the caption storage service, or when the caption integration service finds through query that the caption storage service has stored the caption data in a database, the caption integration service may determine that the caption storage service stores the caption data successfully. In this case, the caption integration service may start to perform step 34.

Through the foregoing solution shown in FIG. 3, in a live streaming scenario, audio stream data in live video stream data may be obtained, speech recognition may be performed on the audio stream data and caption data may be generated according to a recognition result, and then caption text in the caption data may be added to a picture frame corresponding to the caption text in the video stream according to time information, so as to obtain a live video stream including a caption, and implement accurate synchronization of a caption with a video picture. In addition, there is no need to insert the caption data manually, so that a live streaming delay can be efficiently reduced.

The foregoing solution shown in FIG. 3 may be implemented by different devices in the live streaming system. For example, in a possible implementation, the foregoing video stream processing method may be performed by the server in the live streaming system. In one embodiment, after receiving a live video stream uploaded by the live video recording terminal, the server obtains live video stream data and performs the foregoing processing shown in FIG. 3 on the live video stream data.

In a possible implementation, the foregoing video stream processing method may be performed by the live video recording terminal in the live streaming system. For example, before uploading live video stream data to the server, the live video recording terminal obtains the live video stream data, and performs the foregoing processing shown in FIG. 3 on the live video stream data.

In a possible implementation, the foregoing video stream processing method may be performed by the user terminal in the live streaming system. For example, after receiving live video stream data pushed by the server and before playing the live video stream data, the user terminal performs the foregoing processing shown in FIG. 3 on the live video stream data.

In the following embodiments of this application, an example in which the foregoing video stream processing method is performed by the server in the live streaming system is used for description.

Figure 4:
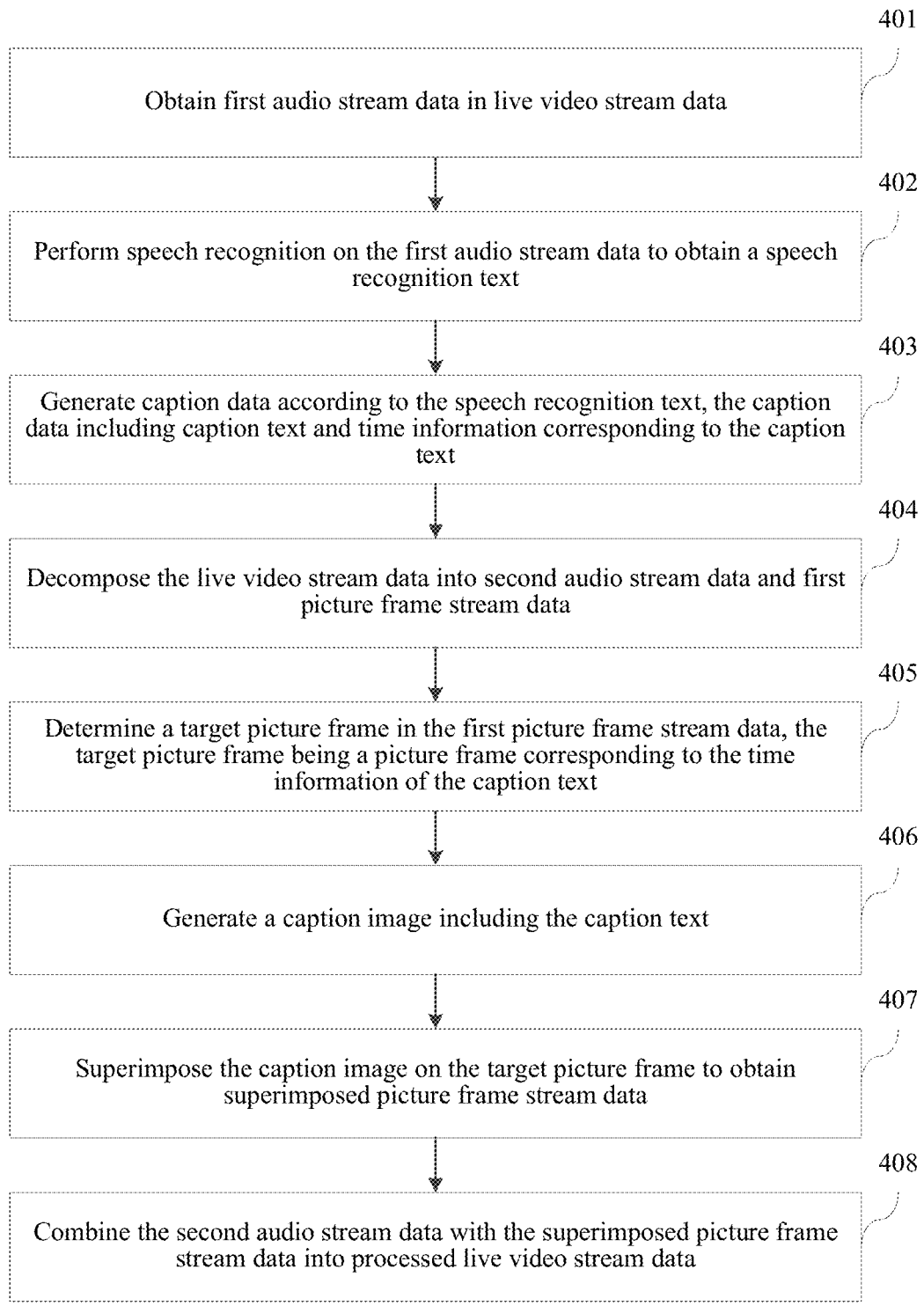
FIG. 4 is a flowchart of a video stream processing method according to an exemplary embodiment.

FIG. 4 is a flowchart of a video stream processing method in a live streaming scenario according to an exemplary embodiment. The video stream processing method in the live streaming scenario may be applied to a server. For example, the method may be applied to the server 240 shown in FIG. 1. As shown in FIG. 4, the video stream processing method in the live streaming scenario may include the following steps.

In step 401, first audio stream data in live video stream data is obtained.

Using a server as an example, a live video recording terminal records a live video at a live streaming field, and encodes the recorded video into a live video stream (which may be also referred to as an original video stream) and uploads the live video stream to the server; after receiving the live video stream uploaded by the live video recording terminal, the server first transcodes the received live video stream to obtain (or generate) the live video stream data.

In an embodiment of this application, the live video stream data includes picture frame stream data and audio stream data. The picture frame stream data includes a series of picture frame data blocks, and each picture frame data block includes a plurality of picture frames. The audio stream data includes a series of audio frame data blocks, and each audio frame data block includes a plurality of audio frames.

The picture frame data block and the audio frame data block in the live video stream data can have a one-to-one correspondence, that is, a play time of one picture frame data block and a play time of one audio frame data block are the same. For example, the picture frame data block and the audio frame data block each include respective time information, and the correspondence between the picture frame data block and the audio frame data block is indicated by the respective time information. In other words, the picture frame data block and the audio frame data block that are in the one-to-one correspondence include the same time information.

Figure 5:
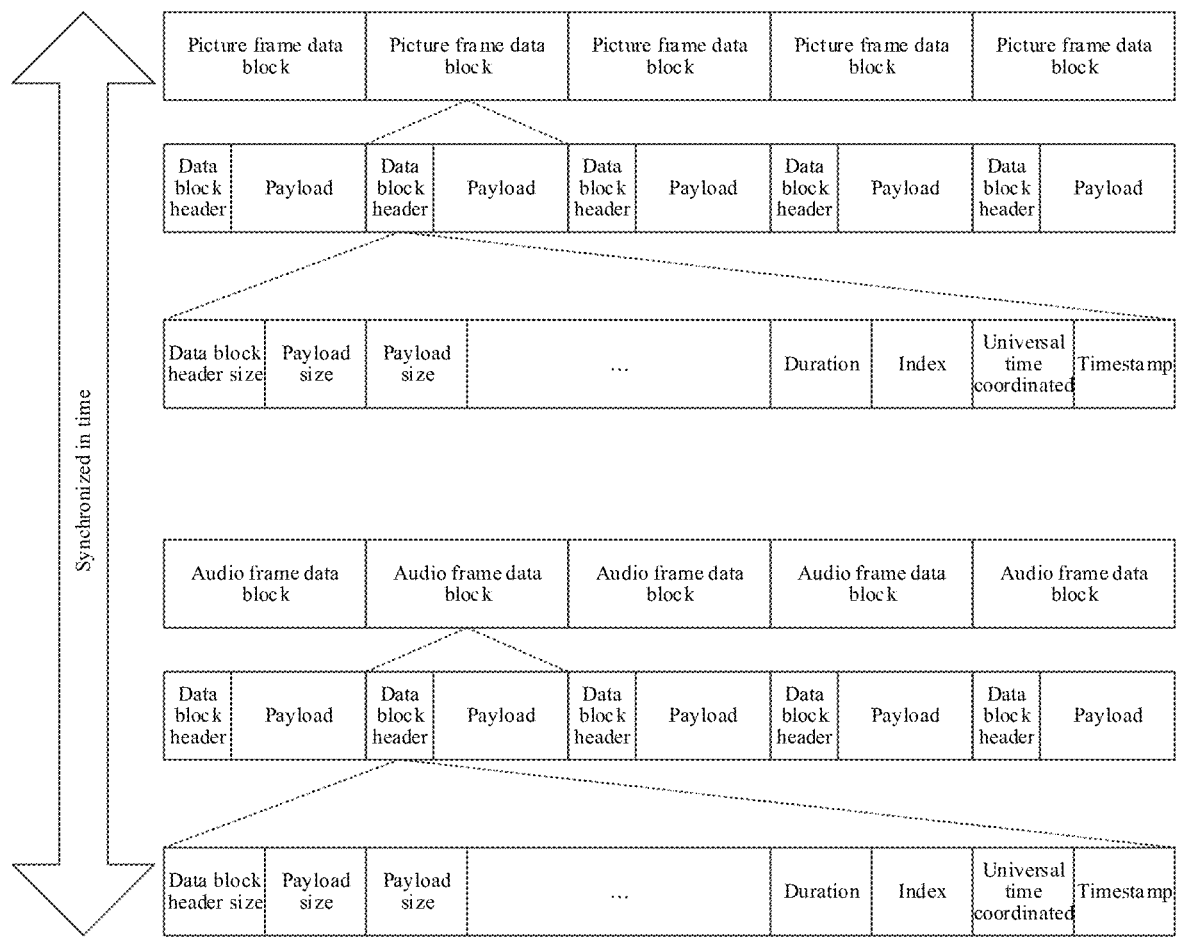
FIG. 5 is a diagram of a data structure of live video stream data according to the embodiment in FIG. 4 in an example.

For example, FIG. 5 is a diagram of a data structure of live video stream data according to an embodiment of this application. As shown in FIG. 5, a picture frame data block in the live video stream data includes two parts: a data block header and payload. The payload includes picture frames in the picture frame data block, and the data block header includes information such as a data block header size, a payload size, a duration, an index, a universal time coordinated (UTC), and a timestamp. The data block header size is used for indicating a data volume occupied by a data block header in a current picture frame data block, the payload size is used for indicating a data volume occupied by a payload in the current picture frame data block, the duration is used for indicating a play duration of picture frames in the current picture frame data block, the index is used for indicating the picture frames in the current picture frame data block, the UTC is used for indicating a system time at which the current picture frame data block is transcoded (e.g., which may be a system time at which the first picture frame in the picture frame data block is transcoded), and the timestamp is used for indicating a time location of the current picture frame data block in the live video stream.

In FIG. 5, an audio frame data block in the live video stream data also includes two parts: a data block header and payload. The payload includes audio frames in the audio frame data block, and the data block header includes information such as a data block header size, a payload size, a duration, an index, a UTC, and a timestamp.

In the live video stream data shown in FIG. 5, the respective time information of the picture frame data block and the audio frame data block may be displayed by using the UTC and/or the timestamp in the respective data block header. In other words, for a set of a picture frame data block and an audio frame data block that are synchronized in time, UTCs in data block headers of the two are the same, and timestamps in the data block headers of the two are also the same.

In this embodiment of this application, after obtaining the live video stream data through transcoding, the server may obtain the first audio stream data in the live video stream data, and cache the live video stream data locally.

In step 402, speech recognition is performed on the first audio stream data to obtain (or generate) speech recognition text.

Because a segment of audio stream data may include a plurality of segments of speech, to improve accuracy of speech recognition, in an embodiment of this application, the server may extract an audio frame corresponding to each segment of speech from the first audio stream data, and perform speech recognition on the audio frame corresponding to each segment of speech respectively.

For example, the server may perform a speech start-end detection on the first audio stream data, to obtain a speech start frame and a speech end frame in the first audio stream data. The speech start frame corresponds to an audio frame at the beginning of a segment of speech, and the speech end frame corresponds to an audio frame at the end of the segment of speech. The server extracts at least one segment of speech data from the first audio stream data according to the speech start frame and the speech end frame in the first audio stream data, the speech data including an audio frame between a set of a corresponding speech start frame and a corresponding speech end frame. Then the server performs speech recognition on the at least one segment of speech data to obtain (or generate) recognition sub-text corresponding to the at least one segment of speech data. Finally, the server determines the recognition sub-text corresponding to the at least one segment of speech data as the speech recognition text.

Figure 6:
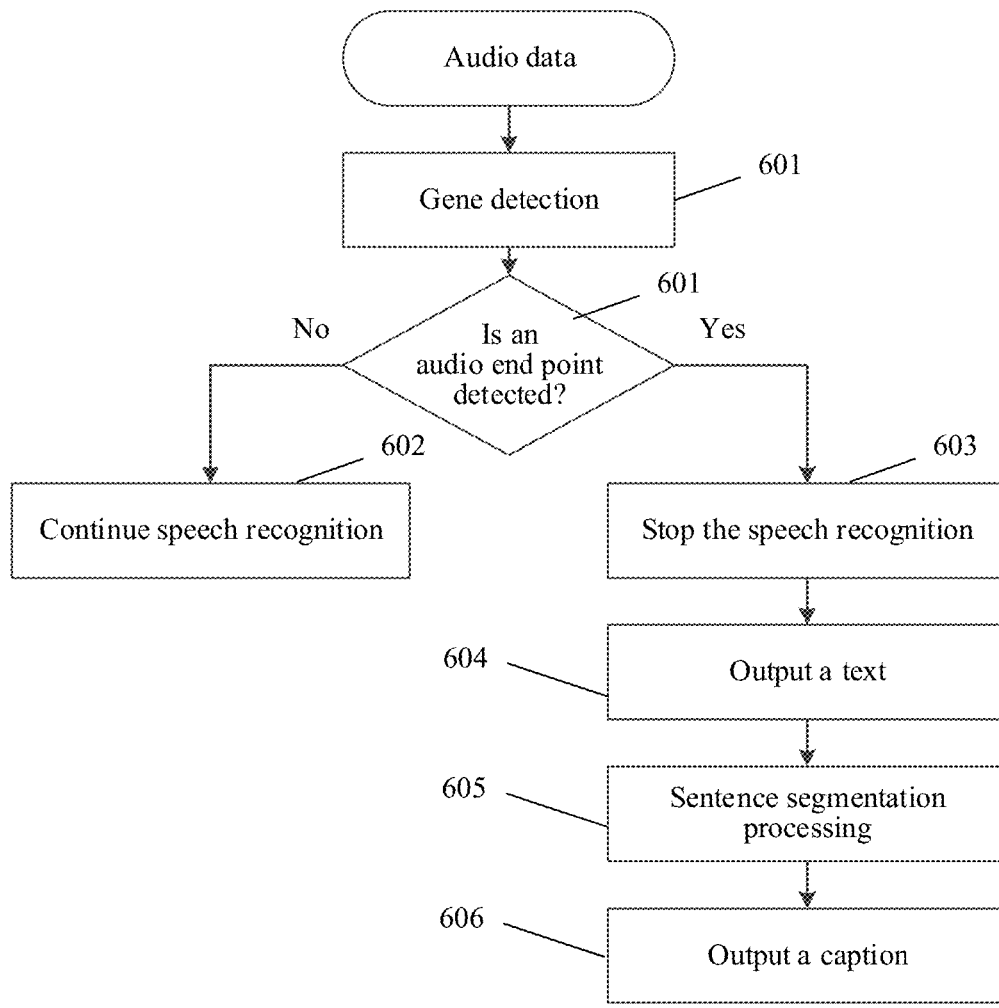
FIG. 6 is a flowchart of speech recognition according to the embodiment in FIG. 4 in an example.

The server may implement the speech start-end detection through gene detection. In this embodiment, the gene detection may also be referred to as characteristics detection, and the server may determine whether an audio frame in audio data corresponds to an audio end point according to characteristics of the audio data. For example, FIG. 6 is a flowchart of speech recognition according to an embodiment of this application. As shown in FIG. 6, after recognizing a speech start frame in the audio data (e.g., the first audio stream data), the server starts to perform gene detection on each audio frame after the speech start frame to determine whether the audio frame detected currently corresponds to an audio end point (which is equivalent to the speech end frame) (step 601); inputs the detected audio frame into a speech recognition module for speech recognition (step 602); when detecting an audio end point, the server stops the speech recognition (step 603); outputs a recognized text (step 604); performs sentence segmentation processing (step 605); and outputs a caption (step 606).

In step 403, caption data is generated according to the speech recognition text, the caption data including caption text and time information corresponding to the caption text.

In an embodiment of this application, the server may translate the speech recognition text obtained through the foregoing step into translated text corresponding to a target language, and generate the caption text according to the translated text, the caption text including the translated text, or the caption text including the speech recognition text and the translated text. Then, the server generates the caption data including the caption text.

In this embodiment of this application, the server may generate corresponding caption data for each language. For example, assuming that a language corresponding to the speech recognition text obtained through the speech recognition is Chinese, and target languages include four languages: English, Russian, Korean, and Japanese. An example in which the caption text includes the speech recognition text and the translated text is used. Then, the server may generate four types of caption data: caption data corresponding to "Chinese+English", caption data corresponding to "Chinese+Russian", caption data corresponding to "Chinese+Korean", and caption data corresponding to "Chinese+Japanese".

Figure 7:
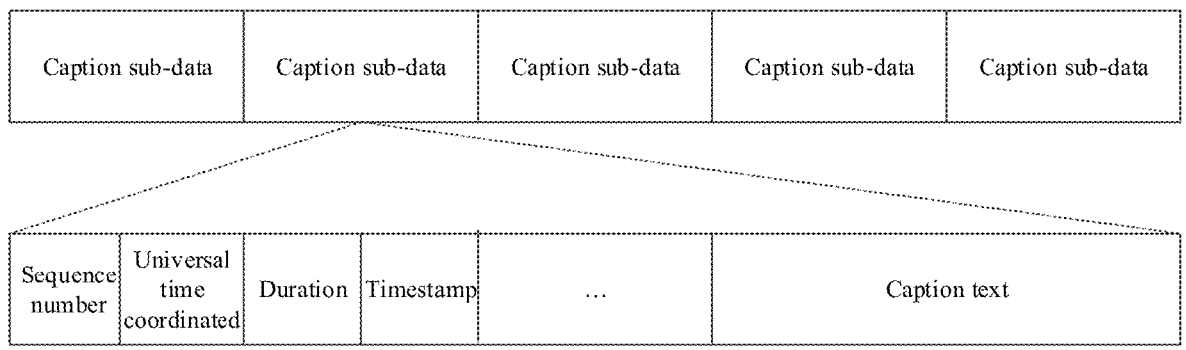
FIG. 7 is a schematic structural diagram of caption data according to the embodiment in FIG. 4 in an example.

In an embodiment of this application, the caption data further includes time information corresponding to the caption text. For example, the caption data may include a plurality of pieces of caption sub-data, and each piece of caption sub-data corresponds to a complete segment of speech. FIG. 7 is a schematic structural diagram of caption data according to an embodiment of this application. As shown in FIG. 7, each piece of caption sub-data includes information such as a sequence number, a UTC, duration, a timestamp, and caption text. The duration in the caption sub-data may be a duration of a segment of speech, the UTC in the caption sub-data may be a start time point of a corresponding complete segment of speech (e.g., a UTC at which the first audio frame corresponding to the complete segment of speech is transcoded), and the timestamp in the caption sub-data may be a timestamp of the first audio frame of the corresponding complete segment of speech. The UTC and/or the timestamp in the caption sub-data is time information of the caption text included in the caption sub-data. The segment of speech may be a speech segment including one or more sentences.

The time information corresponding to the caption text may be time information of speech corresponding to the caption text. For example, in step 402, when performing speech recognition on the first audio stream data, the server records time information of each segment of speech data. Time information of a segment of speech data may include a time point (e.g., a UTC/timestamp) corresponding to a speech start frame of the segment of speech data, and a duration of the segment of speech data. When generating caption sub-data corresponding to a recognition text of a segment of speech data, the server uses translated text of the recognition text as caption text in the corresponding caption sub-data, and uses time information of the segment of speech data as time information of the caption text in the caption sub-data.

In step 404, the live video stream data is decomposed (e.g., separated) into second audio stream data and first picture frame stream data.

In an embodiment of this application, when adding the caption text in the caption data to a picture frame in the live video stream data, the server may first decompose the live video stream data into the second audio stream data and the first picture frame stream data. The step of decomposing can also be referred to as audio and video demultiplexing.

In step 405, a target picture frame in the first picture frame stream data is determined, the target picture frame being a picture frame corresponding to the time information of the caption text.

In an embodiment of this application, for each piece of caption sub-data, the server may obtain a UTC and a duration in the caption sub-data, determine a target end time point (e.g., the target end time point is a time point after the UTC, and a duration between the time point and the UTC is the duration) according to the UTC and the duration, and determine each picture frame located between the UTC and the target end time point in the caption sub-data in the first picture frame stream data as the target picture frame.

In an embodiment of this application, for each piece of caption sub-data, the server may obtain a timestamp and a duration in the caption sub-data, determine a target end time point (e.g., the target end time point is a time point after a time point corresponding to the timestamp, and a duration between the time point and the time point corresponding to the timestamp is the duration) according to the timestamp and the duration, and determine each picture frame located between the time point corresponding to the timestamp and the target end time point in the caption sub-data in the first picture frame stream data as the target picture frame.

In step 406, a caption image including (or of) the caption text is generated.

The server may generate, corresponding to each piece of caption sub-data, a caption image corresponding to the caption text in the piece of caption sub-data. The caption image may be a transparent or translucent image including the caption text.

In step 407, the caption image is superimposed on the target picture frame to obtain (or generate) superimposed picture frame stream data.

For a piece of caption sub-data, the server may superimpose a caption image including caption text in the caption sub-data on each target picture frame corresponding to the caption sub-data, to obtain superimposed picture frame stream data corresponding to the caption sub-data.

Figure 8:
FIG. 8 is a schematic diagram of caption superimposition according to the embodiment in FIG. 4 in an example.
Figure 8:
Figure 8:

FIG. 8 is a schematic diagram of caption superimposition according to an embodiment of this application. As shown in FIG. 8, a picture frame 81 is a picture frame in target picture frames corresponding to a caption image 82 in the picture frame stream data, the server superimposes the caption image 82 on the picture frame 81 to obtain (or generate) a superimposed picture frame 83, and replaces the picture frame 81 in the picture frame stream data with the superimposed picture frame 83.

In step 408, the second audio stream data is combined with the superimposed picture frame stream data into processed live video stream data (e.g., captioned live video stream data). For example, the second audio stream data is combined with the superimposed picture frame stream data to generate the processed live video stream data.

The server may perform data alignment on the second audio stream data and the superimposed picture frame stream data according to the time information, and combine the aligned second audio stream data with the superimposed picture frame stream data into the processed live video stream data.

In an embodiment of this application, the second audio stream data and the first picture frame stream data obtained through the decomposition in step 404 include audio frame data blocks and picture frame data blocks respectively, and time information in the audio frame data blocks and the picture frame data blocks before and after the decomposition remains unchanged. In the foregoing step of superimposing the caption image on the corresponding picture frame (e.g., step 407), the time information corresponding to the picture frame data block also remains unchanged. That is, the audio frame data blocks included in the second audio stream data are also in a one-to-one correspondence with the picture frame data blocks in the superimposed picture frame stream data. The server may align data blocks, corresponding to the same time information (e.g., a timestamp and/or a UTC), of the second audio stream data and the superimposed picture frame stream data.

Figure 9:
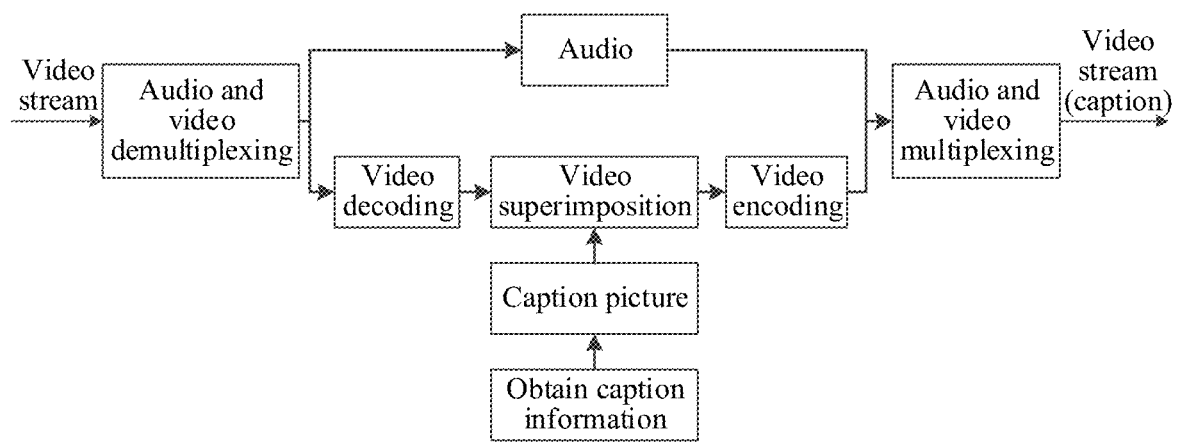
FIG. 9 is a schematic diagram of a caption superimposition procedure according to the embodiment in FIG. 4 in an example.

FIG. 9 is a schematic diagram of a caption superimposition procedure according to an embodiment of this application. In FIG. 9, the server performs audio and video demultiplexing on an inputted video stream (corresponding to the live video stream data) to obtain audio and video, and decodes the video part to obtain picture frames. Meanwhile, the server further obtains caption information (corresponding to the caption data) and generates a caption picture (corresponding to the caption image). The server superimposes the generated caption picture on a corresponding picture frame obtained through the decoding (e.g., the video superimposition step shown in FIG. 7, step 407), performs video encoding on a superimposed picture frame to obtain a video, and multiplexes the video obtained through the encoding and the audio to obtain a video stream including a caption.

In an embodiment of this application, after receiving a request transmitted by the user terminal, the server pushes the processed live video stream data to the user terminal for the user terminal to playback.

For example, the server may receive a video stream obtaining request transmitted by the user terminal; obtain language indication information carried in the video stream obtaining request, the language indication information being used for indicating a caption language; and push the processed live video stream data to the user terminal in a case that the caption language indicated by the language indication information is a language corresponding to the caption text.

A user watching the live video may request a live video stream including a caption of a designated language at the user terminal side. For example, the user may select a caption of a language in a caption selection interface of the user terminal side, and then the user terminal transmits a video stream obtaining request to the server, the video stream obtaining request including language indication information indicating the caption language selected by the user; upon receiving the video stream obtaining request transmitted by the user terminal, the server may obtain the language indication information.

For the processed live video stream data obtained in step 408, when the caption language indicated by the language indication information in the video stream obtaining request transmitted by the user terminal is a language corresponding to the superimposed caption text in the processed live video stream data obtained in step 408, the server may push the processed live video stream data to the user terminal for the user terminal to playback.

In an embodiment of this application, the server may generate a corresponding live video stream superimposed with a caption for caption text of each language or a language combination. When the user terminal side selects a language or a language combination, the server may transmit a live video stream superimposed with a caption of the language or the language combination to the user terminal.

Figure 10:
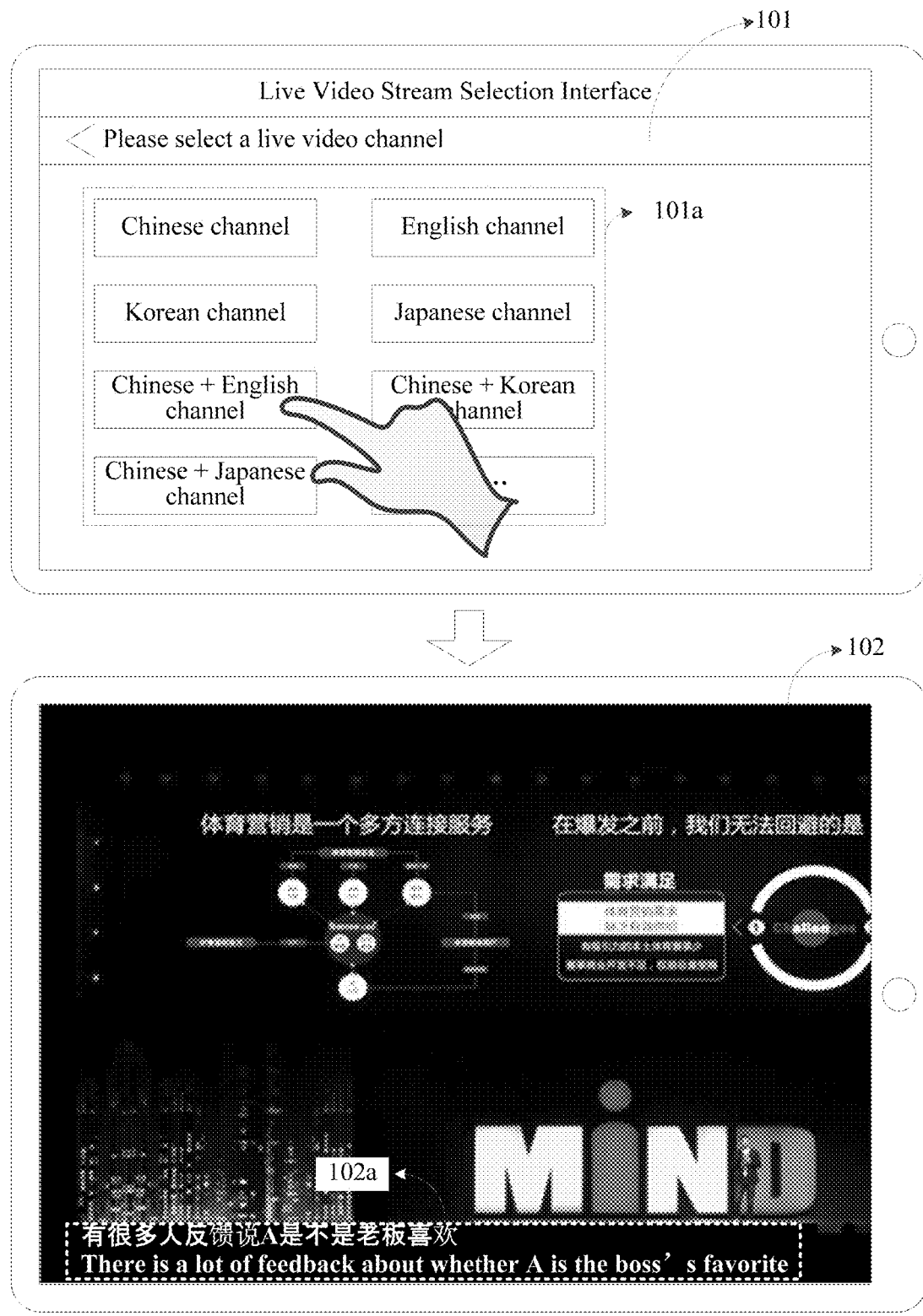
FIG. 10 is a schematic diagram of a live video stream selection according to the embodiment in FIG. 4 in an example.

In a possible implementation, the user may select a caption type for a corresponding live video stream when entering the live video interface. For example, FIG. 10 is a schematic diagram of a live video stream selection according to an embodiment of this application. As shown in FIG. 10, when the user turns on a live streaming channel, the user terminal displays a live video stream selection interface 101, which includes a plurality of live streaming entrances 101a. Each live streaming entrance 101a corresponds to a caption of a language or language combination. After the user selects (e.g., clicks or taps) one of the live streaming entrances 101a (e.g., a live streaming entrance corresponding to a caption of a language combination of Chinese+English is shown in FIG. 10), the user terminal displays a live video interface 102, and transmits a video stream obtaining request to the server. The video stream obtaining request indicates that the user selects the caption of the language combination of Chinese+English. Then the server pushes a live video stream corresponding to the Chinese+English caption to the user terminal for the user terminal to display in the live video interface 102. In this case, a caption 102a in the live video interface 102 is the Chinese+English caption.

Figure 11:
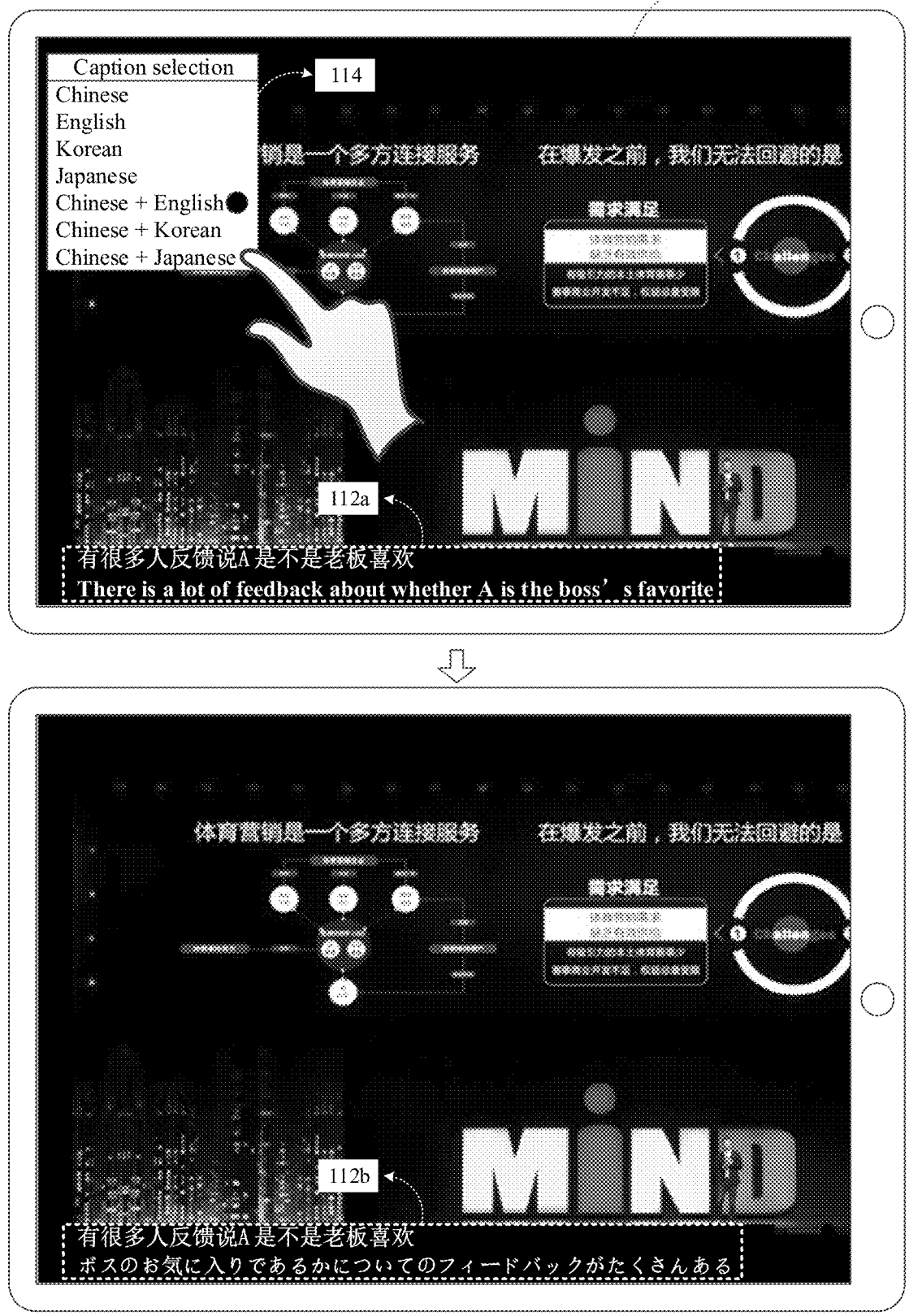
FIG. 11 is a schematic diagram of another live video stream selection according to the embodiment in FIG. 4 in an example.

In a possible implementation, the user may switch to a different live video stream with a different caption in a process of watching the live video. For example, FIG. 11 is a schematic diagram of a live video stream selection according to an embodiment of this application. As shown in FIG. 11, at the first moment, the caption 112a included in the live video picture displayed in a live video interface 112 of the user terminal is the Chinese+English caption. When the user intends to switch a language of the caption in the live video picture, the user may call a caption selection menu 114 through clicking/tapping or the like, and select a caption of another language or language combination (e.g., as shown in FIG. 11, the user selects a caption of a language combination of Chinese+Japanese). Then, the user terminal transmits a video stream obtaining request to the server. The video stream obtaining request indicates that the user selects the caption of the language combination of Chinese+Japanese. The server pushes a live video stream corresponding to the Chinese+Japanese caption to the user terminal for the user terminal to display in the live video interface. As shown in FIG. 11, at the second moment after the user selects the Chinese+Japanese caption, the caption in the live video interface 112 is switched to a Chinese+Japanese caption 112b.

To sum up, in the solution shown in this embodiment of this application, the server may obtain audio stream data in live video stream data, perform speech recognition on the audio stream data and generate caption data according to a recognition result, and then add caption text in the caption data to a picture frame corresponding to the caption text in the video stream according to time information, so as to obtain a live video stream including a caption, and implement accurate synchronization of a caption with a video picture. In addition, there is no need to insert the caption data manually, so that a live streaming delay can be efficiently reduced.

In addition, in the solution shown in this embodiment of this application, the picture frame of the live video stream pushed to the user terminal already includes the caption, so that the user terminal may display the live video picture with the caption to the user without further processing the live video stream.

Figure 12:
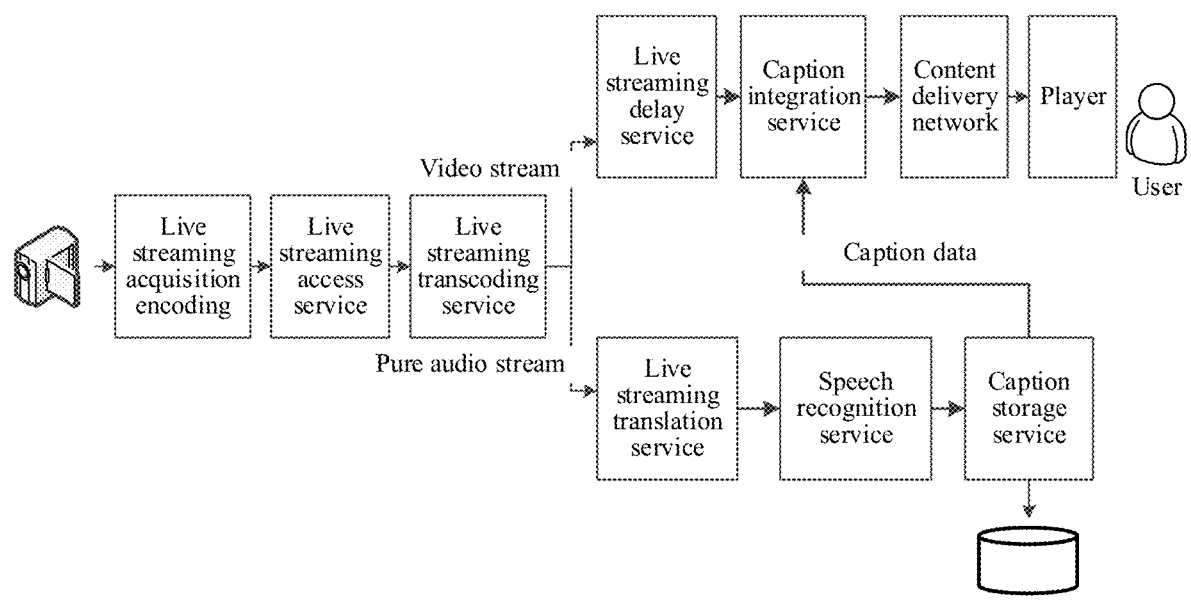
FIG. 12 is a schematic diagram of a live video stream processing procedure according to an exemplary embodiment.

Based on the solution shown in FIG. 4, FIG. 12 is a schematic diagram of a live video stream processing procedure according to an exemplary embodiment. As shown in FIG. 12, after acquiring a live video picture through a camera and encoding the live video picture, the live video recording terminal uploads a live video stream to the server through the live streaming access service, and the server transcodes the uploaded live video stream through the live streaming transcoding service, and outputs a video stream (including picture frame data blocks and audio frame data blocks) and an audio stream (e.g. a pure audio stream including the audio frame data blocks only) that are synchronized in time information. After the transcoding, on the one hand, the server delays output of the video stream through a live streaming delay service (e.g., delaying a preset duration). On the other hand, the server transmits the audio data (e.g., the audio stream or pure audio stream) obtained through the transcoding to the speech recognition module for recognition and translation through a live streaming translation service. The speech recognition module is configured to implement speech recognition and translation, and write a translation result (e.g., caption data) into the caption storage service (e.g., the live streaming translation service and the speech recognition module herein are equivalent to the caption generation service), the caption storage service being responsible for storage of the caption data. When the delay reaches the preset duration, through the caption integration service, the server pulls video data (e.g., the video stream) from the live streaming delay service, and pulls caption data corresponding to the time information from the caption storage service, and synchronously integrates the video data and the caption data into a live video stream including a caption according to the time information (e.g., a timestamp) in the video stream, the audio stream, and the caption data.

FIG. 12 provides a solution based on real-time recognition and translation and synchronous caption superimposition for a live video stream. A live streaming backend (e.g., the server) obtains an audio stream from the live video stream in real time, and adopts an AI algorithm to recognize an audio signal in the audio stream and translate the signal into captions of various target languages in real time; then performs full synchronization and alignment on a video picture, a sound, and caption content according to time information inserted in the video stream, the audio stream, and caption data; and finally superimposes a caption synchronized with the content on the video picture in real time to obtain a video picture including the caption, and integrates the video picture including the caption and audio synchronized with the content to implement a function of adding a caption to a live video stream in real time. This solution has a wide range of usage scenarios and does not require manual intervention, and a caption is superimposed on an original video picture in real time, so that a player terminal can directly play a video stream and display caption information without additional processing.

Figure 13:
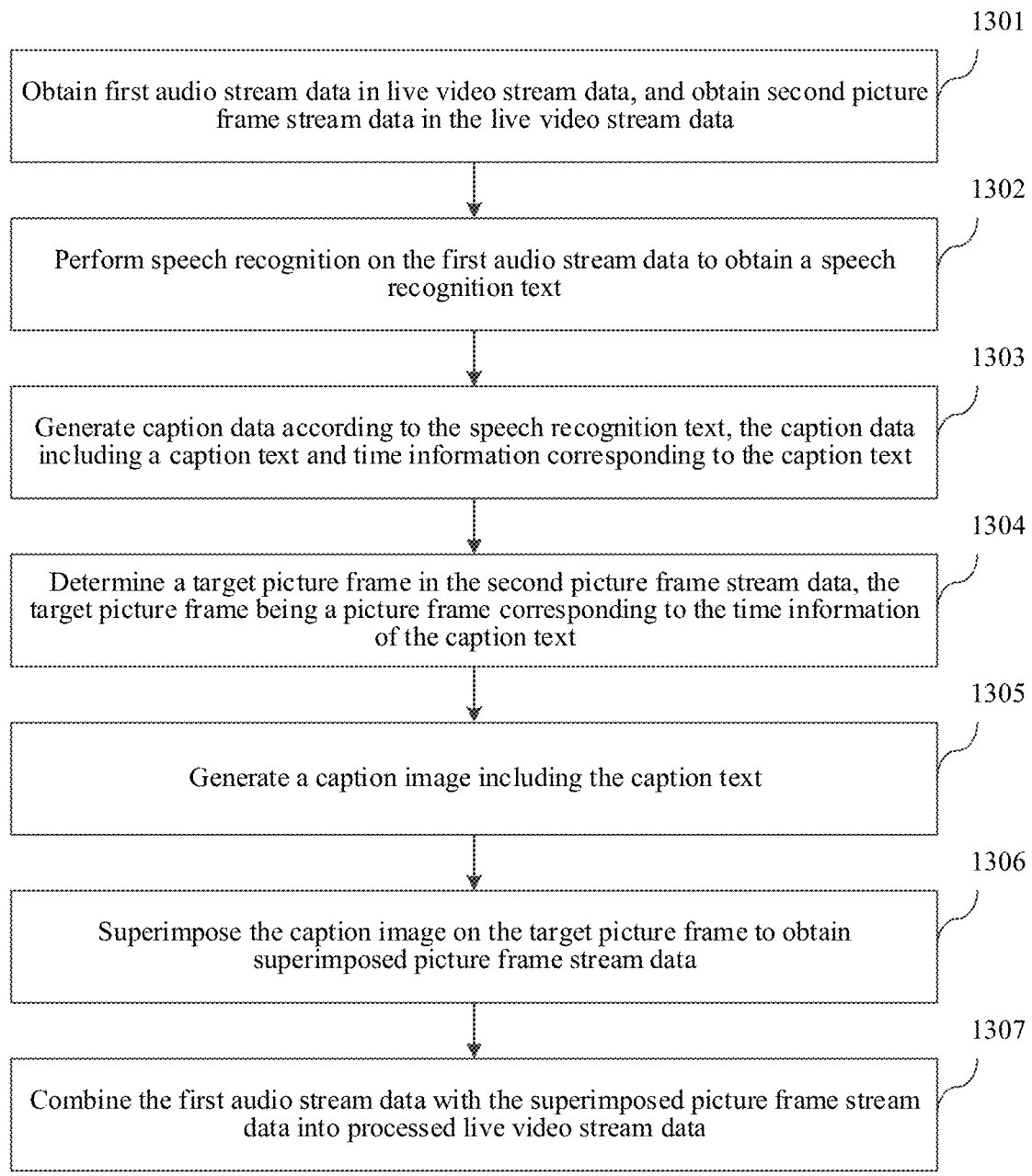
FIG. 13 is a flowchart of a video stream processing method according to an exemplary embodiment.

FIG. 13 is a flowchart of a video stream processing method in a live streaming scenario according to an exemplary embodiment. The video stream processing method in the live streaming scenario may be applied to a server. For example, the method may be applied to the server 240 shown in FIG. 1. As shown in FIG. 13, the video stream processing method in the live streaming scenario may include the following steps.

In step 1301, first audio stream data in live video stream data is obtained and second picture frame stream data in the live video stream data is obtained.

Using a server as an example, after receiving a live video stream uploaded by a live video recording terminal, the server transcodes the received live video stream to obtain the live video stream data. After obtaining the live video stream data through the transcoding, the server may decompose or separate (e.g., demultiplex) the live video stream data into audio stream data (e.g., the first audio stream data) and picture frame stream data (e.g., the second picture frame stream data).

For structural forms of the audio stream data and the picture frame stream data, reference may be made to descriptions of the embodiment shown in FIG. 4, and details are not described herein again.

In step 1302, speech recognition is performed on the first audio stream data to obtain (or generate) speech recognition text.

In step 1303, caption data is generated according to the speech recognition text, the caption data including caption text and time information corresponding to the caption text.

For execution processes of step 1302 and step 1303, reference may be made to descriptions of step 402 and step 403 in the embodiment shown in FIG. 4, and details are not described herein again.

In step 1304, a target picture frame in the second picture frame stream data is determined, the target picture frame being a picture frame corresponding to the time information of the caption text.

In step 1305, a caption image including the caption text is generated.

In step 1306, the caption image is superimposed on the target picture frame to obtain (or generate) superimposed picture frame stream data.

In step 1307, the first audio stream data is combined with the superimposed picture frame stream data into processed live video stream data (e.g., captioned live video stream data). For example, the first audio stream data is combined with the superimposed picture frame stream data to generate the processed live video stream data.

The solution shown in step 1304 to step 1307 is similar to that described in step 405 to step 408 in the embodiment corresponding to FIG. 4, and details are not described herein again.

To sum up, in the solution shown in this embodiment of this application, the server may obtain audio stream data in live video stream data, perform speech recognition on the audio stream data and generate caption data according to a recognition result, and then add caption text in the caption data to a picture frame corresponding to the caption text in the video stream according to time information, so as to obtain a live video stream including a caption, and implement accurate synchronization of a caption with a video picture. In addition, there is no need to insert the caption data manually, so that a live streaming delay can be efficiently reduced.

In addition, in the solution shown in this embodiment of this application, the picture frame of the live video stream pushed to the user terminal already includes the caption, so that the user terminal may display the live video picture with the caption to the user without further processing the live video stream.

Figure 14:
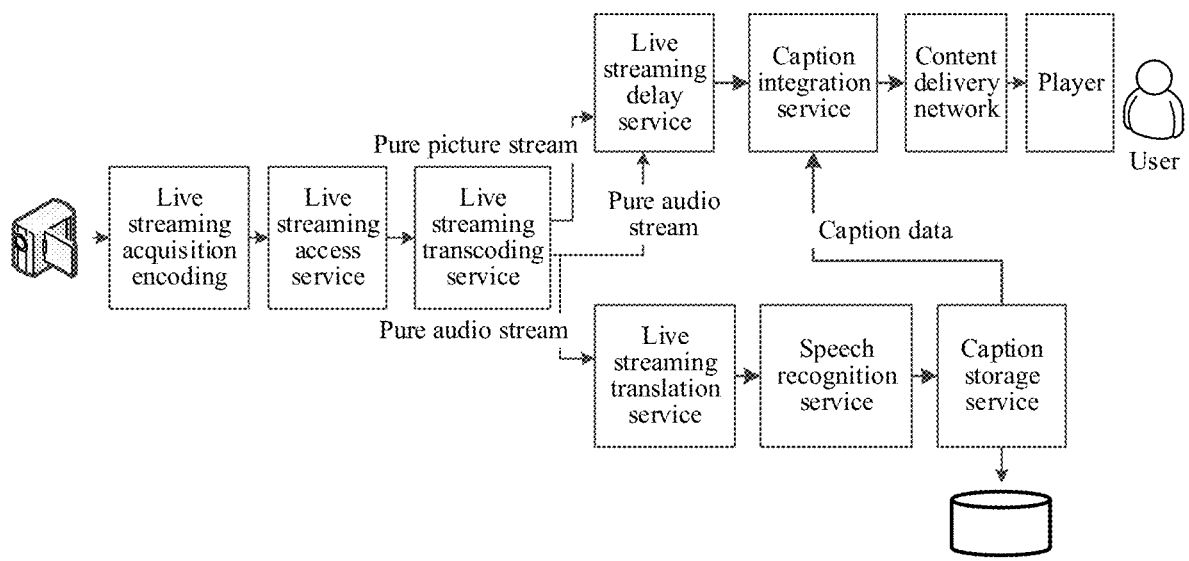
FIG. 14 is a schematic diagram of a live video stream processing procedure according to an exemplary embodiment.

Based on the solution shown in FIG. 13, FIG. 14 is a schematic diagram of a live video stream processing procedure according to an exemplary embodiment. As shown in FIG. 14, after acquiring a live video picture through a camera and encoding the live video picture, the live video recording terminal uploads a live video stream to the server through the live streaming access service, the server transcodes the uploaded live video stream through the live streaming transcoding service, and outputs a picture stream (e.g., a pure picture stream including picture frame data blocks only) and an audio stream (e.g., a pure audio stream including audio frame data blocks only) that are synchronized in time information. After the transcoding, on the one hand, the server delays output of the pure picture stream through the live streaming delay service (e.g., delaying a preset duration); on the other hand, the server splits the pure audio stream into two channels, one channel being input to the live streaming delay service to delay output of the pure audio stream, and the other channel being input to the live streaming translation service to transmit, through the live streaming translation service, the pure audio stream to the speech recognition module for recognition and translation, and write a translation result (e.g., caption data) into the caption storage service, the caption storage service being responsible for storage of the caption data. When the delay reaches the preset duration, through the caption integration service, the server pulls video data (e.g., the pure picture stream and the pure audio stream) from the live streaming delay service, and pulls caption data corresponding to the time information from the caption storage service, and synchronously integrates the video data and the caption data into a live video stream including a caption according to the time information (e.g., a timestamp) in the pure picture stream, the pure audio stream, and the caption data.

Figure 15:
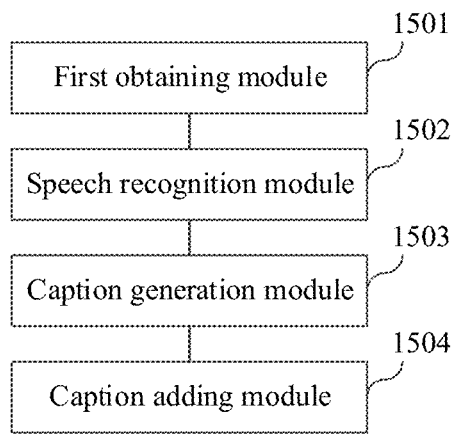
FIG. 15 is a structural block diagram of a video stream processing apparatus in a live streaming scenario according to an exemplary embodiment.

FIG. 15 is a structural block diagram of a video stream processing apparatus in a live streaming scenario according to an exemplary embodiment. The video stream processing apparatus in the live streaming scenario may be used in the system shown in FIG. 2, to perform all or some steps of the method provided in the embodiment of FIG. 3, FIG. 4, or FIG. 13. The video stream processing apparatus in the live streaming scenario may include a first obtaining module 1501, a speech recognition module 1502, a caption generation module 1503, and a caption adding module 1504. One or more of the modules can be implemented by processing circuitry, for example.

The first obtaining module 1501 is configured to obtain first audio stream data in live video stream data;

The speech recognition module 1502 is configured to perform speech recognition on the first audio stream data to obtain speech recognition text.

The caption generation module 1503 is configured to generate caption data according to the speech recognition text, the caption data including caption text and time information corresponding to the caption text.

The caption adding module 1504 is configured to add the caption text to a corresponding picture frame in the live video stream data according to the time information corresponding to the caption text to obtain processed live video stream data.

In some embodiments, the caption adding module 1504 includes a decomposition unit, a first picture frame determining unit, a first image generation unit, a first superimposition unit, and a first combining unit.

The decomposition unit is configured to decompose the live video stream data into second audio stream data and first picture frame stream data.

The first picture frame determining unit is configured to determine a target picture frame in the first picture frame stream data, the target picture frame being a picture frame corresponding to the time information.

The first image generation unit is configured to generate a caption image including the caption text.

The first superimposition unit is configured to superimpose the caption image on the target picture frame to obtain superimposed picture frame stream data.

The first combining unit is configured to combine the second audio stream data with the superimposed picture frame stream data into the processed live video stream data.

In some embodiments, the first combining unit is specifically configured to perform data alignment on the second audio stream data and the superimposed picture frame stream data according to the time information; and combine the aligned second audio stream data with the superimposed picture frame stream data into the processed live video stream data.

In some embodiments, the apparatus further includes a second obtaining module that is configured to obtain second picture frame stream data in the live video stream data before the caption adding module adds the caption text to the corresponding picture frame in the live video stream data according to the time information corresponding to the caption text to obtain the processed live video stream data.

The caption adding module 1504 includes a second picture frame determining unit, a second image generation unit, a second superimposition unit, and a second combining unit.

The second picture frame determining unit is configured to determine a target picture frame in the second picture frame stream data, the target picture frame being a picture frame corresponding to the time information.

The second image generation unit is configured to generate a caption image including the caption text.

The second superimposition unit is configured to superimpose the caption image on the target picture frame to obtain superimposed picture frame stream data.

The second combining unit is configured to combine the first audio stream data with the superimposed picture frame stream data into the processed live video stream data.

In some embodiments, the caption adding module 1504 is specifically configured to perform, after a delay of a preset duration from a first moment, the step of adding the caption text to a corresponding picture frame in the live video stream data according to the time information corresponding to the caption text to obtain processed live video stream data, the first moment being a moment (or time) at which the live video stream data is obtained.

In some embodiments, the caption adding module 1504 is specifically configured to perform, when the caption data is obtained, the step of adding the caption text to a corresponding picture frame in the live video stream data according to the time information corresponding to the caption text to obtain processed live video stream data.

In some embodiments, the speech recognition module 1502 is specifically configured to: (i) perform a speech start-end detection on the first audio stream data to obtain a speech start frame and a speech end frame in the first audio stream data, the speech start frame being an audio frame at the beginning of a segment of speech, and the speech end frame being an audio frame at the end of the segment of speech; (ii) extract at least one segment of speech data from the first audio stream data according to the speech start frame and the speech end frame in the first audio stream data, the speech data including an audio frame between a set of a corresponding speech start frame and a corresponding speech end frame; (iii) perform speech recognition on the at least one segment of speech data to obtain recognition sub-text corresponding to the at least one segment of speech data; and (iv) determine the recognition sub-text corresponding to the at least one segment of speech data as the speech recognition text.

In some embodiments, the caption generation module 1503 is specifically configured to: (i) translate the speech recognition text into translated text corresponding to a target language; (ii) generate the caption text according to the translated text, the caption text including the translated text, or the caption text including the speech recognition text and the translated text; and (iii) generate the caption data including the caption text.

In some embodiments, the apparatus further includes a request receiving module, an indication obtaining module, and a pushing module.

The request receiving module is configured to receive a video stream obtaining request transmitted by a user terminal.

The indication obtaining module is configured to obtain language indication information carried in the video stream obtaining request, the language indication information being used for indicating a caption language.

The pushing module is configured to push the processed live video stream data to the user terminal in a case that the caption language indicated by the language indication information is a language corresponding to the caption text.

To sum up, in the solution shown in this embodiment of this application, the video stream processing apparatus may obtain audio stream data in live video stream data, perform speech recognition on the audio stream data and generate caption data according to a recognition result, and then add caption text in the caption data to a picture frame corresponding to the caption text in the video stream according to time information, so as to obtain a live video stream including a caption, and implement accurate synchronization of a caption with a video picture. In addition, there is no need to insert the caption data manually, so that a live streaming delay can be efficiently reduced.

Figure 16:
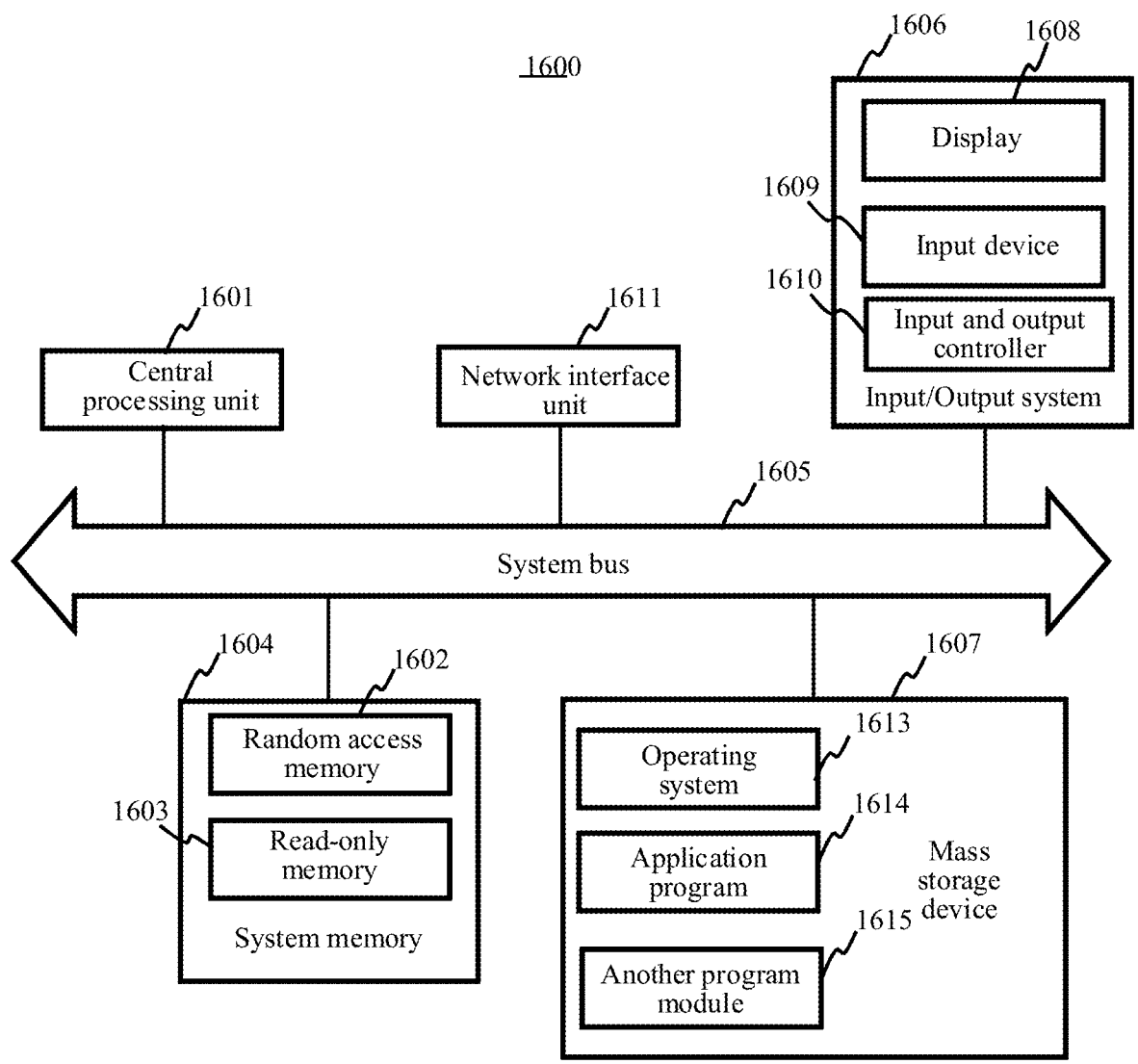
FIG. 16 is a schematic block diagram of a computer device according to an exemplary embodiment.

FIG. 16 is a schematic block diagram of a computer device 1600 according to an exemplary embodiment of this application. The computer device 1600 may be the live video recording terminal 220, the server 240, or the user terminal 260 in the live streaming system. The computer device 1600 includes a central processing unit (CPU) 1601 (or processing circuitry), a system memory 1604 including a random access memory (RAM) 1602 and a read-only memory (ROM) 1603, and a system bus 1605 connecting the system memory 1604 and the CPU 1601. The computer device 1600 further includes a basic input/output system (I/O system) 1606 configured to transmit information between components in the computer, and a mass storage device 1607 configured to store an operating system 1613, an application program 1614, and another program module 1615.

The basic I/O system 1606 includes a display 1608 configured to display information, and an input device 1609 used by a user to input information, such as a mouse or a keyboard. The display 1608 and the input device 1609 are both connected to the CPU 1601 by using an input and output controller 1610 connected to the system bus 1605. The basic I/O system 1606 may further include the input and output controller 1610, for receiving and processing an input from a plurality of other devices such as a keyboard, a mouse, or an electronic stylus. Similarly, the I/O controller 1610 further provides an output to a display screen, a printer, or another type of output device.

The mass storage device 1607 is connected to the CPU 1601 by using a mass storage controller (not shown) connected to the system bus 1605. The mass storage device 1607 and an associated computer-readable medium provide non-volatile storage for the computer device 1600. That is, the mass storage device 1607 may include a computer-readable medium (not shown), such as a hard disk or a CD-ROM drive.

In general, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. It may be known by a person skilled in the art that the computer storage medium is not limited to the foregoing several types. The system memory 1604 and the mass storage device 1607 may be collectively referred to as a memory.

The computer device 1600 may be connected to the Internet or another network device by using a network interface unit 1611 connected to the system bus 1605.

The memory further includes one or more programs. The one or more programs are stored in the memory. The CPU 1601 executes the one or more programs to implement all or some steps of any method shown in FIG. 3, FIG. 4, and FIG. 13.

In an exemplary embodiment, a non-transitory computer-readable storage medium including an instruction, for example, a memory including a computer program (an instruction), is further provided, and the program (the instruction) may be executed by a processor in a computer device to perform the video stream processing method in the live streaming scenario in the embodiments of this application. For example, the non-transitory computer-readable storage medium may be a ROM, a RAM, a CD-ROM, a magnetic tape, a floppy disk, an optical data storage device, or the like.

After considering the specification and practicing the present disclosure, a person skilled in the art would easily conceive of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application.

What is claimed is:

1. A video stream processing method, the method comprising:
   obtaining, by processing circuitry, first audio stream data in live video stream data;
   performing, by the processing circuitry, speech recognition on the first audio stream data to generate speech recognition text of a segment of speech;
   generating, by the processing circuitry, caption data of the segment of speech according to the speech recognition text of the segment of speech, the caption data including caption text and time information corresponding to the caption text, a time point indicated by the time information being extracted from a header of a speech start audio frame of the segment of speech in the first audio stream data, and the time information that is included in the caption data indicates (1) the time point extracted from the header of the speech start audio frame of the segment of speech on which the speech recognition is performed to generate the speech recognition text of the segment of speech, and (2) a duration of the segment of speech on which the speech recognition is performed, the duration of the segment of speech indicated by the time information that is included in the caption data being different from a duration indicated by the header of the speech start audio frame; and adding, by the processing circuitry, the caption text to a corresponding picture frame in the live video stream data according to the time information corresponding to the caption text to generate captioned live video stream data, the corresponding picture frame being determined based on the time point and the duration.

2. The video stream processing method according to claim 1, wherein the adding comprises:

separating the live video stream data into second audio stream data and first picture frame stream data;

determining a target picture frame in the first picture frame stream data, the target picture frame being determined based on the time point and the duration indicated by the time information that is included in the caption data;

generating a caption image of the caption text;

superimposing the caption image on the target picture frame to generate superimposed picture frame stream data; and combining the second audio stream data with the superimposed picture frame stream data to generate the captioned live video stream data.

3. The video stream processing method according to claim 2, wherein the combining comprises:

synchronizing the second audio stream data and the superimposed picture frame stream data according to the time point; and combining the synchronized second audio stream data and the superimposed picture frame stream data to generate the captioned live video stream data.

4. The video stream processing method according to claim 1, wherein before the adding, the method includes obtaining second picture frame stream data in the live video stream data, and the adding includes:

determining a target picture frame in the second picture frame stream data, the target picture frame being determined based on the time point and the duration indicated by the time information that is included in the caption data;

generating a caption image of the caption text;

superimposing the caption image on the target picture frame to generate superimposed picture frame stream data; and combining the first audio stream data with the superimposed picture frame stream data to generate the captioned live video stream data.

5. The video stream processing method according to claim 1, further comprising:

adding, after a delay of a preset duration from a first moment, the caption text to the corresponding picture frame in the live video stream data according to the time information corresponding to the caption text to generate the captioned live video stream data, the first moment being a time the live video stream data is obtained.

6. The video stream processing method according to claim 1, further comprising:

determining when the caption data of the segment of speech is stored, wherein the adding includes adding, after the caption data is determined as stored, the caption text to the corresponding picture frame in the live video stream data according to the time information corresponding to the caption text to generate the captioned live video stream data.

7. The video stream processing method according to claim 1, wherein the performing the speech recognition comprises:

performing a speech start-end detection on the first audio stream data to obtain the speech start audio frame and a speech end audio frame in the first audio stream data, the speech start audio frame corresponding to a beginning of a segment of speech, and the speech end audio frame corresponding to an end of the segment of speech;

extracting at least one segment of speech data from the first audio stream data according to the speech start audio frame and the speech end audio frame in the first audio stream data, the speech data including another audio frame between the speech start audio frame and the speech end audio frame;

performing speech recognition on the at least one segment of speech data to obtain recognition sub-text corresponding to the at least one segment of speech data; and determining the recognition sub-text corresponding to the at least one segment of speech data as the speech recognition text.

8. The video stream processing method according to claim 1, wherein the generating the caption data comprises:

translating the speech recognition text into translated text corresponding to a target language;

generating the caption text according to the translated text, the caption text including the translated text; and generating the caption data including the caption text.

9. The video stream processing method according to claim 1, wherein the generating the caption data comprises:

translating the speech recognition text into translated text corresponding to a target language;

generating the caption text according to the translated text, the caption text including the speech recognition text and the translated text; and generating the caption data including the caption text.

10. The video stream processing method according to claim 1, further comprising:

receiving a video stream obtaining request from a user terminal;

obtaining language indication information in the video stream obtaining request, the language indication information indicating a caption language; and pushing the captioned live video stream data to the user terminal when the caption language indicated by the language indication information corresponds to the caption text.

11. A video stream processing apparatus, comprising:

processing circuitry configured to obtain first audio stream data in live video stream data;

perform speech recognition on the first audio stream data to generate speech recognition text of a segment of speech;

generate caption data of the segment of speech according to the speech recognition text of the segment of speech, the caption data including caption text and time information corresponding to the caption text, a time point indicated by the time information being extracted from a header of a speech start audio frame of the segment of speech in the first audio stream data, and the time information that is included in the caption data indicates (1) the time point extracted from the header of the speech start audio frame of the segment of speech on which the speech recognition is performed to generate the speech recognition text of the segment of speech, and (2) a duration of the segment of speech on which the speech recognition is performed, the duration of the segment of speech indicated by the time information that is included in the caption data being different from a duration indicated by the header of the speech start audio frame; and add the caption text to a corresponding picture frame in the live video stream data according to the time information corresponding to the caption text to generate captioned live video stream data, the corresponding picture frame being determined based on the time point and the duration.

12. The video stream processing apparatus according to claim 11, wherein the processing circuitry is further configured to separate the live video stream data into second audio stream data and first picture frame stream data;

determine a target picture frame in the first picture frame stream data, the target picture frame being determined based on the time point and the duration indicated by the time information that is included in the caption data;

generate a caption image of the caption text;

superimpose the caption image on the target picture frame to generate superimposed picture frame stream data; and combine the second audio stream data with the superimposed picture frame stream data to generate the captioned live video stream data.

13. The video stream processing apparatus according to claim 12, wherein the processing circuitry is further configured to synchronize the second audio stream data and the superimposed picture frame stream data according to the time point; and combine the synchronized second audio stream data and the superimposed picture frame stream data to generate the captioned live video stream data.

14. The video stream processing apparatus according to claim 11, wherein the processing circuitry is further configured to obtain second picture frame stream data in the live video stream data, determine a target picture frame in the second picture frame stream data, the target picture frame being determined based on the time point and the duration indicated by the time information that is included in the caption data;

generate a caption image of the caption text;

superimpose the caption image on the target picture frame to generate superimposed picture frame stream data; and combine the first audio stream data with the superimposed picture frame stream data to generate the captioned live video stream data.

15. The video stream processing apparatus according to claim 11, wherein the processing circuitry is further configured to add, after a delay of a preset duration from a first moment, the caption text to the corresponding picture frame in the live video stream data according to the time information corresponding to the caption text to generate the captioned live video stream data, the first moment being a time the live video stream data is obtained.

16. The video stream processing apparatus according to claim 11, wherein the processing circuitry is further configured to determine when the caption data of the segment of speech is stored; and add, after the caption data is determined as stored, the caption text to the corresponding picture frame in the live video stream data according to the time information corresponding to the caption text to generate the captioned live video stream data.

17. The video stream processing apparatus according to claim 11, wherein the processing circuitry is further configured to perform a speech start-end detection on the first audio stream data to obtain the speech start audio frame and a speech end audio frame in the first audio stream data, the speech start audio frame corresponding to a beginning of a segment of speech, and the speech end audio frame corresponding to an end of the segment of speech;

extract at least one segment of speech data from the first audio stream data according to the speech start audio frame and the speech end audio frame in the first audio stream data, the speech data including another audio frame between the speech start audio frame and the speech end audio frame;

perform speech recognition on the at least one segment of speech data to obtain recognition sub-text corresponding to the at least one segment of speech data; and determine the recognition sub-text corresponding to the at least one segment of speech data as the speech recognition text.

18. The video stream processing apparatus according to claim 11, wherein the processing circuitry is further configured to translate the speech recognition text into translated text corresponding to a target language;

generate the caption text according to the translated text, the caption text including the translated text; and generate the caption data including the caption text.

19. The video stream processing apparatus according to claim 11, wherein the processing circuitry is further configured to translate the speech recognition text into translated text corresponding to a target language;

generate the caption text according to the translated text, the caption text including the speech recognition text and the translated text; and generate the caption data including the caption text.

20. A non-transitory computer-readable storage medium storing instructions, which when executed by a processor, cause the processor to perform a video stream processing method, the video stream processing method comprising:

obtaining first audio stream data in live video stream data;

performing speech recognition on the first audio stream data to generate speech recognition text of a segment of speech;

generating caption data of the segment of speech according to the speech recognition text of the segment of speech, the caption data including caption text and time information corresponding to the caption text, a time point indicated by the time information being extracted from a header of a speech start audio frame of the segment of speech in the first audio stream data, and the time information that is included in the caption data indicates (1) the time point extracted from the header of the speech start audio frame of the segment of speech on which the speech recognition is performed to generate the speech recognition text of the segment of speech, and (2) a duration of the segment of speech on which the speech recognition is performed, the duration of the segment of speech indicated by the time information that is included in the caption data being different from a duration indicated by the header of the speech start audio frame; and adding the caption text to a corresponding picture frame in the live video stream data according to the time information corresponding to the caption text to generate captioned live video stream data, the corresponding picture frame being determined based on the time point and the duration.

\* \* \* \* \*